Figure 7:
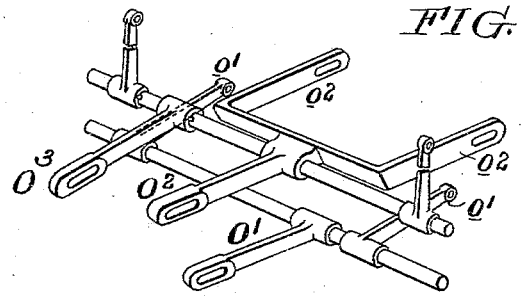

(No Model.) 5 Sheets—Sheet 1.
R. C. RICHARDSON.
JACQUARD APPARATUS.
No. 551,510. Patented Dec. 17, 1895.
FIG. 1.
FIG. 13.
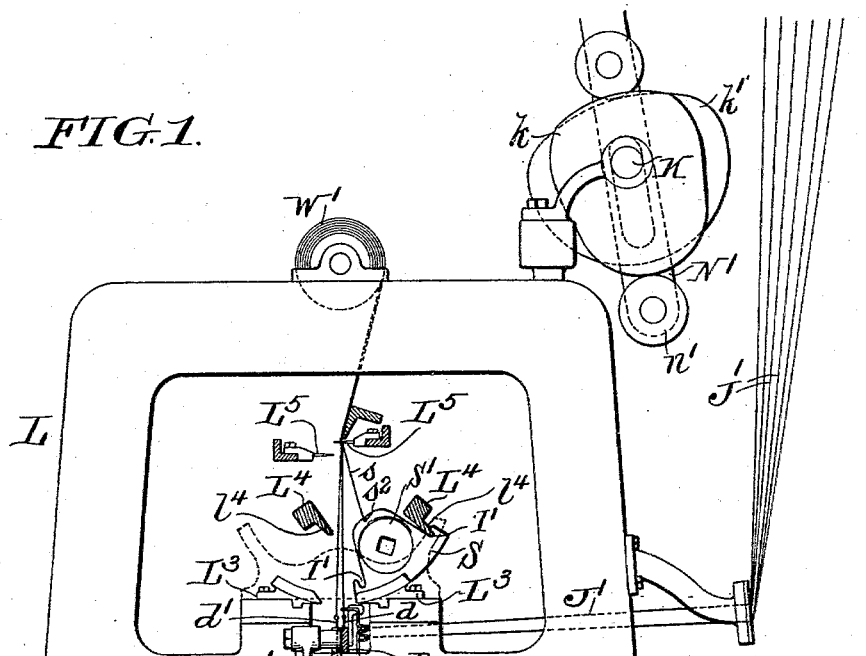
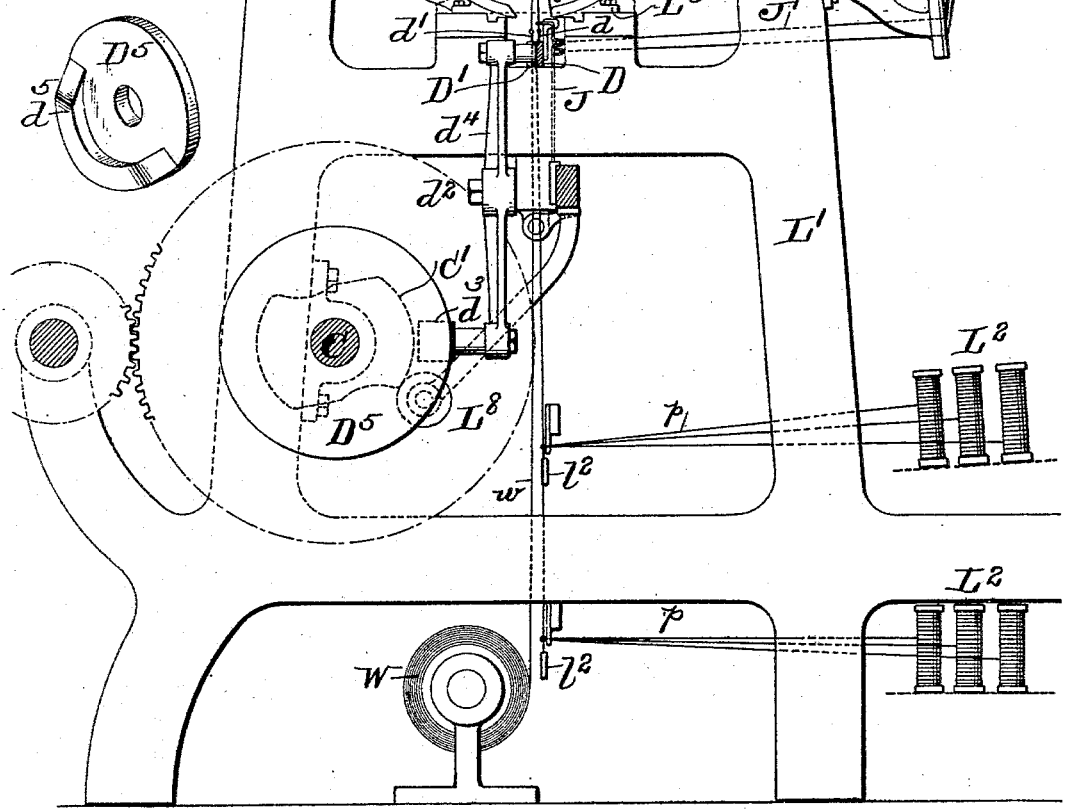
WITNESSES:
INVENTOR:
Rowland C. Richardson

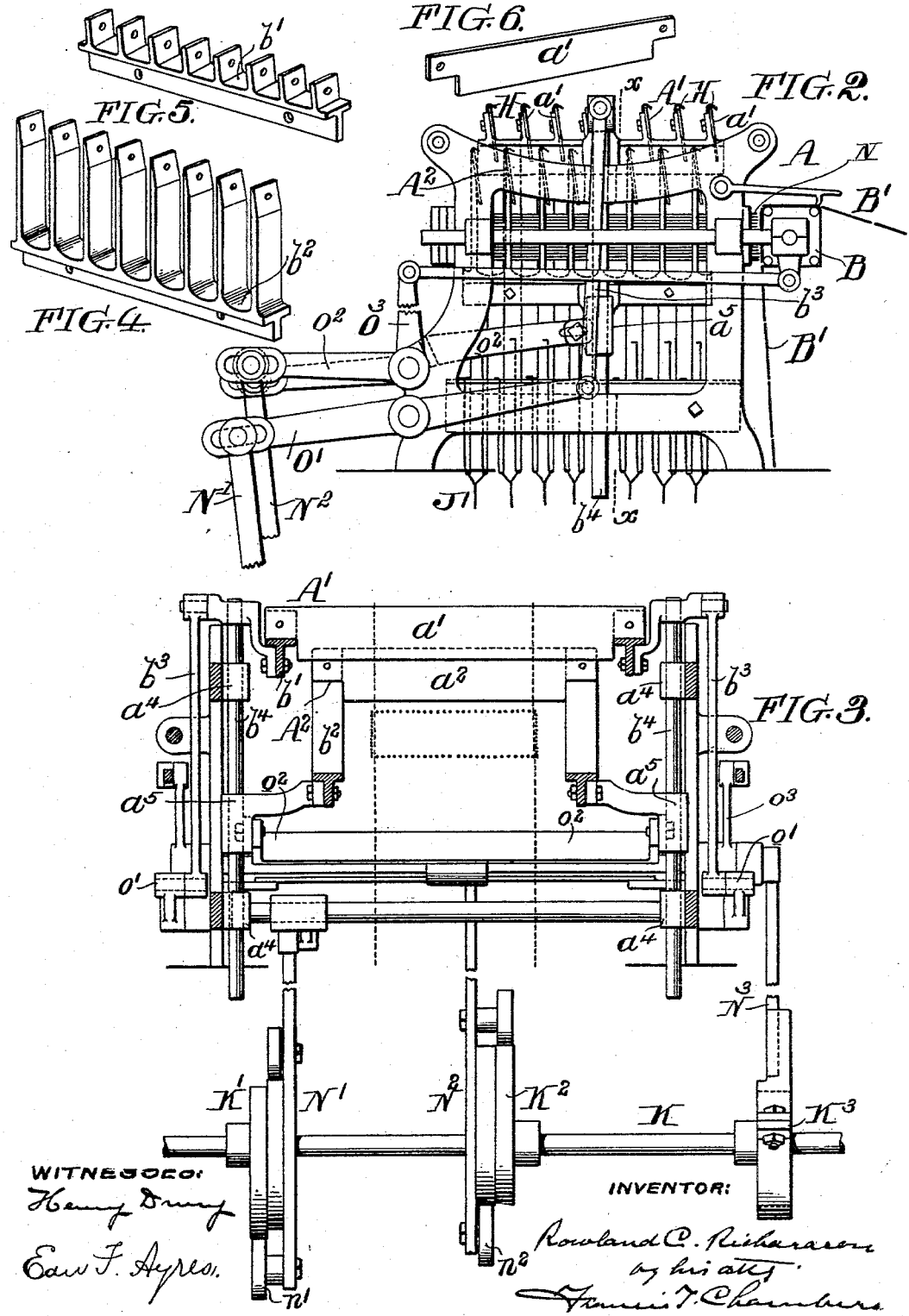

(No Model.) 5 Sheets—Sheet 3.
R. C. RICHARDSON.
JACQUARD APPARATUS.

No. 551,510. Patented Dec. 17, 1895.

WITNESSES:
Henry Drury
Edw. F. Ayres

INVENTOR:
Rowland C. Richardson
by his atty.
Francis T. Chambers (No Model.)  5 Sheets—Sheet 4.
R. C. RICHARDSON.
JACQUARD APPARATUS.
No. 551,510.  Patented Dec. 17, 1895.
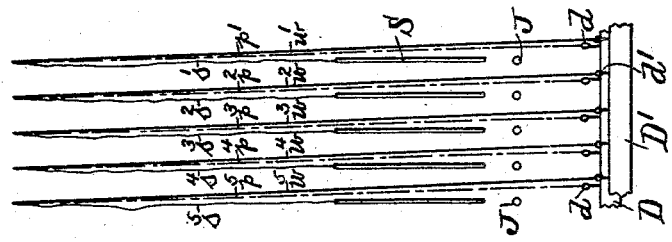
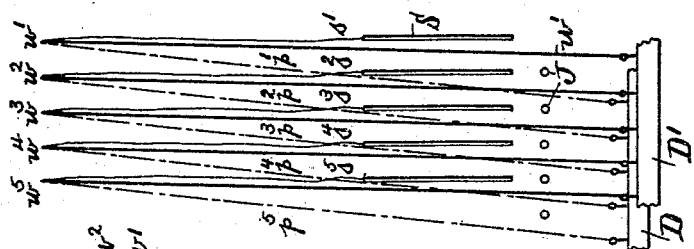
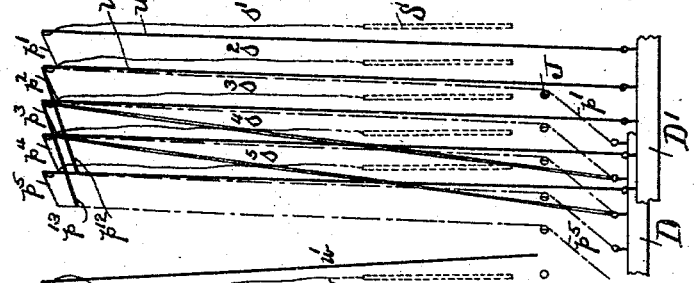
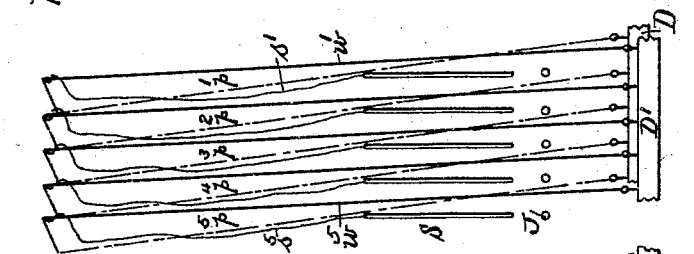
WITNESSES:
Henry Drury
Edw. F. Ayres.
INVENTOR:
Rowland C. Richardson
by his atty.
Francis T. Chambers

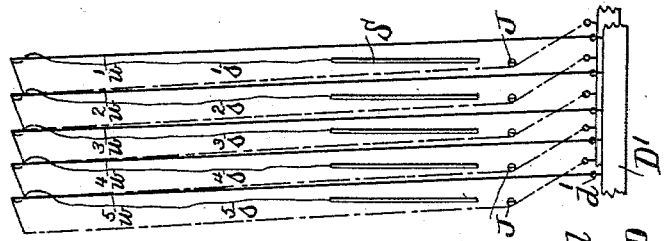

UNITED STATES PATENT OFFICE.

ROWLAND CREASEY RICHARDSON, OF PHILADELPHIA, PENNSYLVANIA, ASSIGNOR TO HIMSELF, WILLIAM O. ROWLAND, AND ALBERT E. SCHMIDT, OF SAME PLACE.

JACQUARD APPARATUS.

SPECIFICATION forming part of Letters Patent No. 551,510, dated December 17, 1895.

Application filed July 7, 1894. Serial No. 516,813. (No model.)

*To all whom it may concern:*

Be it known that I, ROWLAND CREASEY RICHARDSON, a subject of the Queen of Great Britain, residing in the city and county of Philadelphia, in the State of Pennsylvania, have invented certain new and useful Improvements in Jacquard Apparatus, of which the following is a true and exact description, reference being had to the accompanying drawings, which form a part thereof.

My invention relates to Jacquard apparatus, and has for its object to operate a Jacquard apparatus in such a manner that it can either be run at half the speed heretofore necessary, or that one jacquard will do the work of two which have formerly been employed in governing the pattern in weaving certain classes of goods, such operation being especially desirable in looms for weaving goods whereon two or more independent patterns or ornamentations appear—such, for instance, as looms for weaving ornamented Nottingham lace, or for weaving ornamented upholstery goods. Heretofore in weaving this class of goods—as, for instance, lace curtains—it has been customary to govern the pattern in one of two ways. One way was to employ two jacquards, each of which was provided with a separate pack of cards, one apparatus governing the thick portion of the ornamentation, and the other apparatus the shading. Another way was to employ one jacquard which ran at twice the speed of the loom, making two indications to each complete pick of the loom, the first indication of the jacquard governing the heavy portion of the lace figure and the second pick the shading. The main objection to the first arrangement is the cost of the two jacquards and two packs of cards, and to the second the slow speed at which it was necessary to run the loom.

My invention overcomes the objection to both these prior arrangements, since I employ but one jacquard, need but half the cards heretofore employed and make but one indication to each pick of the loom.

To effect this my invention consists, first, in regard to the jacquard proper, irrespective of its particular application to any particular loom, in providing a double-lift jacquard having of course at least two sets of griffs with an indicator mechanism adapted to indicate simultaneously the hooks operated by all or both sets of griffs, and with means for maintaining the hooks in their indicated position after the withdrawal of the indicator mechanism and before the grip is moved to govern a pick.

My invention further consists in certain details of construction which will be pointed out hereinafter.

My invention will be best understood as explained in connection with the accompanying drawings, in which—

Figure 9:
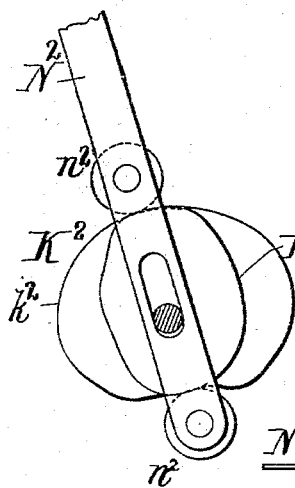
Figure 8:
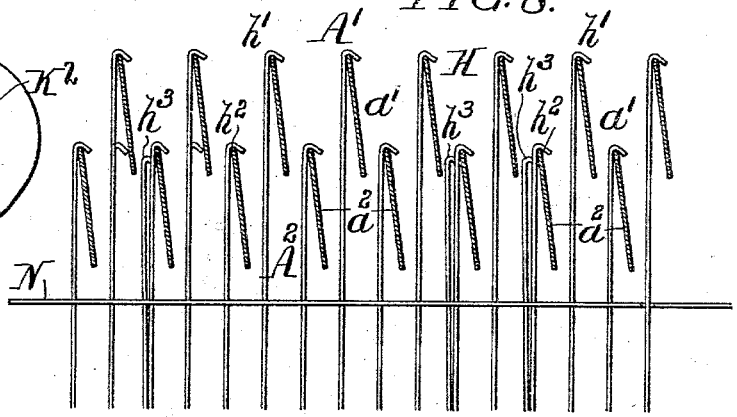
Figure 10:
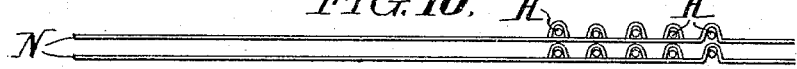
Figure 11:
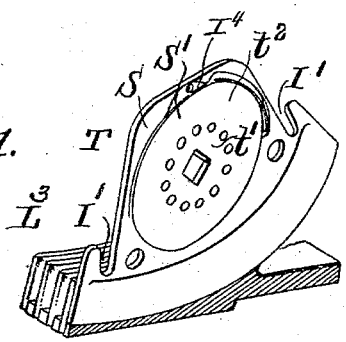
Figure 12:
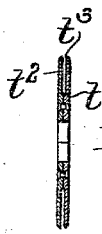

Figure 1 is a side view of a loom designed to produce goods of substantially the character specified. Fig. 2 is a view of a jacquard constructed according to my invention and which when placed in suitable position in respect to the loom shown in Fig. 1, is adapted to govern the pattern of the article woven thereby. Fig. 3 is a section on the line $x\,x$ of Fig. 2. Figs. 4, 5, and 6 are detail views of the supporting-frame for the griff-bars. Fig. 7 is a perspective view of a convenient form of operating mechanism for the two independent griffs. Fig. 8 is a view of the two independent griff-bars, showing how the needles, after indication, are prevented from springing back onto the griff-knives of the set which has not been raised. Fig. 9 is a view of one of the cams for operating one of the sets of griffs. Fig. 10 is a view showing the manner of engagement of the needles and hooks. Fig. 11 is a perspective view of one of the shuttles used in the particular loom shown; Fig. 12, a cross-section of the bobbin; Fig. 13, a detail view of a cam used to actuate the bar which governs the movement of the warp-threads. Figs. 14 to 22 are diagrammatic views illustrating the formation of the stitches and showing how the jacquard operates to control the pattern formed thereby. Fig. 23 is a front view of a few of the shuttles, showing their relative positions to the warp-threads and the other operative parts of the loom; and Fig. 24 is a view illustrating the form of web made by a loom such as shown in Fig. 1.

A (see Fig. 2) is a double-lift jacquard having independent sets of griffs A' and A².

B is the indicating mechanism consisting, in the construction shown, of a square cylinder adapted to carry and present cards B', thereby operating the proper hooks through the medium of needles N. The indicator mechanism is adapted to operate but once during every complete pick of the loom, and at each operation it indicates hooks which are lifted by each set of griffs—that is, it indicates all the hooks which are to be lifted in the two next lifts, one lift of each set of griffs. It is necessary therefore to provide means to maintain the hooks in their indicated position after the withdrawal of the indicator mechanism and before the griffs operate.

In the particular Jacquard apparatus shown, which is of the type most usually employed, it is necessary to prevent the hooks which have been moved out of the path of the set of griffs which makes its lift latest from springing back into the path of the griffs after the withdrawal of the indicator mechanism and before the griffs operate.

Any suitable means for locking the hooks may be employed. I prefer, however, especially when the usual form of Jacquard apparatus shown is employed, the lock shown best in Figs. 2 and 8, which consists of the griffs themselves. To operate the griffs as locks, I first, and immediately after an indication, and before the card or other mechanism is withdrawn, lift both sets of griffs or all the griffs, if more than two sets are employed, to such a height that they will prevent the indicated hooks from springing back onto the griff-knives, but not high enough to regulate the shed. The pattern-indicator mechanism can then be safely withdrawn and the griffs operated one after the other to govern two successive picks or two parts of one pick, or, as in the present case, two independent ornamentations. The two sets of griffs may very conveniently be raised the short distance described simultaneously, but it is not at all necessary that they should move together, all that is necessary being that when the indicator mechanism is withdrawn, both sets of griffs shall be raised to such a height that the hooks which have been moved out of the path of the griffs can not spring back onto them. After both sets of griffs have been raised to this height the indicator mechanism can be immediately withdrawn and the griffs with their selected hooks raised one after the other.

It will of course be evident that while I have shown my jacquard provided with but two sets of griffs more than two sets can be employed, if desired, the operation being exactly the same.

In Figs. 2 and 8 the griffs A' and A² are shown in the position they occupy after an indication has been made, the pattern-card withdrawn, and the griff A¹ raised to regulate a pick, the griff A² being raised so that the indicated hooks (indicated at $h^3$) cannot spring back onto these griffs. This jacquard may be used advantageously in any position where a pattern is to be woven in, which consists of two or more independent parts, no two of which are applied together. A set of griffs can be supplied for each different ornamentation or shade of the pattern, and one card will indicate all the hooks necessary on all the griffs, and the slight lift will be sufficient to preserve the indication on each set of griffs till it is used to govern its pick. This jacquard thus operated is very efficient in making lace curtains and upholstery goods, and I have shown a machine for making curtains governed by such a jacquard.

L is the loom, having a frame L'.

W is the warp-beam; $w$, the warp-threads; W', the take-up roll; L², suitable spools for the weft or pattern threads which are indicated at $p$. $l^2$ $l^2$ indicate lingoes for these threads.

D' D are guide-bars for the warp and pattern threads, respectively. These are best shown in Fig. 23. The guide-bars D D' are each given an endwise motion for a purpose to be hereinafter explained. This is effected in the case of the bar D' for the warp-threads by means of a lever $d^4$ pivoted at $d^2$ and provided with a cam-runner $d^3$ which runs in the face of the cam D⁵. (Shown in detail in Fig. 13.) A cam of a similar character, but of a slightly-different contour and situated preferably at the other end of the loom, operates the bar D. Of course in some looms there are more than two guide-bars, but this is the usual number.

L³ indicates combs or runways for the shuttles. (Shown more clearly in Figs. 11 and 23.)

S S indicate the shuttles of which there may be up to sixteen or more to an inch, according to the fineness of the lace. Their position relative to the warp-threads is shown in Fig. 23, where the warp-threads are shown, for the sake of clearness, somewhat farther apart than they would be in practice.

L⁵ indicates points which serve the same purpose as the reeds of the lay in an ordinary loom. L⁴ L⁴ are beams which have edges $l^4$ $l^4$ which are adapted to engage with notches I' I' on the shuttles S and move the whole line of shuttles simultaneously through the warps.

C is a power-shaft, and K a shaft conveniently arranged on the top of the loom, and revolving at the same rate as the shaft C for giving motion to the jacquard, it being, of course, evident that this is simply shown as a convenient arrangement since the jacquard can be driven by any connections found convenient. By arranging the shaft K as shown, however, a very convenient arrangement is afforded.

In the construction shown, K' is a cam adapted to operate the set of griffs A', N' being a suitable link, O' a lever and $o'$ a suitable frame.

$k'$ indicates a guide-cam to do away with the necessity of a spring.

$n'$ $n'$ are cam-rollers which bear against the cams.

The cam K' is of a suitable shape, substantially as shown, to give the griff A' the motion already described. A second cam K² serves through link N², lever O² and frame o² to operate the griffs A³ as described, k² and n² being a guide-cam and rollers for riding the cams. I have also indicated at K³ an eccentric for operating the cylinder B in a well-known manner, N³ and O³ indicating suitable connections.

The construction of the shuttles usually employed is shown in Figs. 11 and 12, S being the shuttle and S' the bobbin which turns in a suitable socket I⁴ in the shuttle, and as the shuttle is of course very thin the bobbin is constructed of thin sheet metal, as indicated in Fig. 12, two disks $t^2 t^2$ being secured together at $t'$ forming between them the space $t^3$ in which the thread is wound.

J J are the picks which serve to govern the pattern. These picks project into the pattern-shed, as shown in Fig. 1, but they are connected by means of the cords J' to the hooks of the jacquard, which operate to draw back certain of the picks to regulate the pattern. The position of the shuttle-threads and other parts is shown more clearly in Fig. 23.

The stitch or weave and the manner of making it are best explained in connection with Figs. 14 to 22, which illustrate, diagrammatically, the various positions a thread will take in the course of making a pattern such as is shown in Fig. 24, the mechanism being capable of forming the net proper, indicated at $r$, the heavy shading or clothing indicated at $r'$ and the light shading indicated at $r^2$.

In Figs. 14 to 22 $w' w^2$, &c., indicate warp-threads, $p' p^2$, &c., the pattern or weft-threads, and $s' s^2$ the shuttle-threads. S S, &c., are the shuttles; J, the picks; $d'$, the eyes in beam D' for the warps, and $d$ the eyes for the pattern-threads. The beam D' has a movement first one way and then back, so as to carry the warps from the position shown in Fig. 14 to that shown in Fig. 15. The warp-threads are indicated in heavy black lines, the pattern-threads in dot-and-dash lines, and the shuttle-threads in light irregular lines. The threads being in the position shown in Fig. 14 and the shuttles behind the web, as shown in Fig. 1, and the picks J out of engagement with the threads, the first motion is a motion of the warp-threads $w' w^2$, &c., one space to the left, and of the pattern-threads two spaces to the left, this motion being given by the endwise movement of the guide-bars D D', through the eyes $d$ $d'$ of which pass respectively the pattern and warp threads. At this point the indication occurs, and supposing that I desire to form the shaded portion (indicated at $r^2$ in Fig. 24) all of the picks J will come forward to prevent the free movement of the pattern-threads to the left with the guide-bars D, which, after the indication, move to the left a distance sufficient to move the free pattern-threads two spaces.

In Fig. 16 I have shown all the pattern-threads as detained by the picks. When the threads are in this position the shuttles S make their forward movement, and the points L⁵ draw the threads into position, as shown at the top of Fig. 16, the shuttle-threads $s'$ $s^2$, &c., taking a partial turn round the warp-threads and pattern - threads. The next motion is the return of the warp-threads to their original position, as shown in Fig. 14, and the return movement of the pattern-threads three spaces, this motion being given by the movement of the guide-bars D' and D. Indication is now made, and, as I am forming a shading at $r^2$ the picks will all be withdrawn, permitting the guide-bar D to move all the pattern-threads one space toward the right, as shown in Fig. 18. The shuttles now make return to their original position, going through the warp-threads and, as it will be noted, on the other side of a particular warp-thread from the side on which they made their forward motion, thus wrapping the shuttle-threads $s'$ $s^2$, &c., around the warp-threads and pattern - threads, tying them together. The next motion would be the movement of the warp-threads one space to the left and of the pattern - threads two spaces to the left, leaving the shade in the position shown in Fig. 15 and ready for the forward motion of the shuttles, after the proper indication has been made. This, it will be noted, forms the shaded portion shown at $r^2$ in Fig. 24.

To form the heavy portion called "clothing," (indicated at $r'$ in Fig. 24,) it is simply necessary to withdraw the proper picks, which prevent the movement of the pattern-threads with their guide-bar D. This I have indicated in Fig. 16, where pattern-threads, shown in double lines, are supposed to have been free to move with their guide-bars. The movement of the guide - bar will therefore cause these pattern - threads to be moved three spaces in advance of their starting-point, and then they will be caught up and tied by the shuttle-threads attached to three shuttles instead of one. There will be therefore three pattern-threads in the space occupied by one thread in making the stitch shown in Fig. 19 or at $r'$ in Fig. 24. To form the net portion shown at $r$ it is simply necessary to tie the pattern - threads and the warp - threads together for one or more picks. The way that this is done is shown in Figs. 20, 21, and 22. Fig. 20 shows the position of the threads which are shown in Fig. 17. If the indication does not permit these threads to move with the guide-bar, as they did in Fig. 18, the threads being held in the position they had in Fig. 17 by the picks, the backward movement of the shuttle will, therefore, simply wind the shuttle-threads $s s'$, &c., around the warp and pattern threads without making a stitch. On the indicating - picks being withdrawn the pattern-threads will fall to the position shown in Fig. 22, and then when the guide-bars make their movement one space to the left for the warp-threads, and two spaces for the pattern-threads, it being noted that the warp-thread $p'$ will simply lie close against the warp-thread $w^2$ and the pattern-thread $p^2$ against the warp-thread $w^3$, and so on, and the picks preventing any further movement all these threads have simply to be tied together without making any cross-stitch. Thus by permitting the picks to move forward or holding them back by the action of the jacquard it will be seen that any two forms of ornamentation will be very readily formed by the machine illustrated.

It will be noted how very well a Jacquard apparatus constructed according to my invention is adapted to govern the formation of a pattern, such as has been described. The clothing $r'$ and the shading $r^2$ or the net $r$ would of course never be required at the same place. Each pick J is therefore connected to two hooks, one operated by each set of griffs. The set of griffs which operates first will actuate the picks which serve to govern the movement of the pattern-threads as the shuttles make their forward motion, and the griff which operates last the picks which have the same function on the back motion of the shuttles and since, as is, of course, evident, it is never necessary that the thick clothing and the shade are needed at the same place at the same time, the indication for a complete pick can be made before the pick is begun and then secured by raising the griffs or other locking means and used to regulate the pattern whenever in the course of the pick it becomes necessary.

It has been, as before suggested, customary to employ two jacquards, one of which indicated the forward movement and the other the back movement of the shuttles, (the other mode of working with one jacquard run at double speed not being so usually employed on account of the slow speed at which the loom had to be run.) Each jacquard had, of course, its pack of cards and driving mechanism. By my improvement one jacquard and its driving mechanism can be entirely dispensed with and one pack of cards, which is an important item in this class of weaves, can also be discarded, all the indication which was previously put on two cards being made in one.

Another and perhaps the most important advantage gained is the increase in speed permitted. In weaving machinery the causes which limit speed are principally the indication and the time needed for the throw of a ground-shuttle. The second cause of delay can be substantially disregarded in a lace-loom, where the shuttle is positively actuated instead of thrown, but the indicator mechanism has always limited the speed. In my improved apparatus, however, where a single jacquard need make but one indication to every complete forward and back travel of the shuttles the loom can be speeded up much beyond its present limit. I have found in practice that this increase in speed and consequently in production is, at the most conservative estimate, more than fifteen per cent.

It will, of course, be understood that while I have described my jacquard as employed with a lace-loom, where the combination results in a very effective machine, I do not, of course, wish to limit it to such an application, as it can be employed in controlling the pattern in various styles of weaves.

In the figures on Sheet 2 of the drawings I have shown the preferred form of my jacquard more in detail. The griff-knives $a'$ are secured at each end to frames $b'$ $b'$ which have secured to them guide-rods $b^4$ which project through guide-eyes $a^4$ secured to the frame of the apparatus. The frames $b'$ are connected to the lever-frame $o'$ by means of links $b^3$. The griff-knives $a^2$ are shown secured to frames $b^2$ which have guide-eyes $a^5$ which surround the rods $b^4$ and so guide the frames $b^2$. This construction affords a very compact Jacquard apparatus and both sets of griffs are guided very exactly.

As before stated, any suitable means may be employed for locking or holding the hooks and preventing them from engaging the griffs after the indicating mechanism has been withdrawn and before the griffs are actuated to form the shed. I claim to be the first to effect this operation, and would have it understood that, although, when I use herein the expression "means for preventing the hooks from engaging the griffs," &c., or expressions of similar import, I refer to the griffs and the mechanism for moving them to thus hold the hooks. I do not intend thereby to limit my claims to these griffs and their operating mechanism, but desire and intend said claims to be construed broadly so as to cover any suitable means for preventing the hooks from engaging the griffs between the time when the indicator is withdrawn and the starting of the griffs to form the shed or govern a pick. I would also have it understood that, although I have herein illustrated, described and claimed the indicator as adapted to select the hooks that are to be operated by the griffs and the hooks that are not to be so operated as being those that are prevented from engaging the griffs after the withdrawal of said indicator and before the griffs start, it is equally within the contemplation of my invention and the intended scope of my claims to have the indicator select those hooks that are not to be operated by the griffs, in which case the hooks to be prevented from engaging the griffs at the time specified would be the ones selected by the indicator.

Having now described my invention, what I claim as new, and desire to secure by Letters Patent, is—

1. The combination in a Jacquard apparatus of two or more sets of griffs, means for operating the griffs successively to raise selected hooks, hooks adapted to be operated by the griffs, an indicator mechanism adapted to indicate hooks operated by all the griffs before any of the griffs are operated to regulate a pick, and means for maintaining the hooks in their indicated position after the indicating mechanism is withdrawn and before the griffs are moved to govern a pick.

2. The combination, in a Jacquard apparatus, of a plurality of griffs, hooks operated by said griffs, and an indicator mechanism for selecting the hooks to be operated by all the griffs before any of said griffs are actuated, and means for preventing the unselected hooks from engaging the griffs after the indicating mechanism has been withdrawn and before said griffs are actuated.

3. The combination, in a Jacquard apparatus, of griffs, means to operate them alternately, hooks operated by said griffs, and mechanism for simultaneously indicating the hooks to be operated by all the griffs, and means for preventing the hooks which are not to be operated by the griff that is latest to act from engaging said griff after the indicating mechanism is withdrawn and before said griff is actuated.

4. The combination, in a Jacquard apparatus, of two sets of griffs, means to operate them alternately, hooks operated by said griffs, and a card-presenting cylinder for simultaneously indicating the hooks to be operated by both sets of griffs, and means for preventing the hooks which are not to be operated by the set of griffs that is latest to act from engaging said set of griffs after the withdrawal of the pattern and before said set of griffs is actuated.

5. A Jacquard apparatus consisting of two sets of griffs, hooks operated thereby and an indicator mechanism for indicating simultaneously the hooks operated by both sets of griffs, in combination with means for raising both sets of griffs for a short distance substantially for the purpose specified and then lifting first one and then the other set of griffs to make two consecutive picks.

6. A Jacquard apparatus consisting of two sets of griffs, hooks operated thereby, a cylinder, and pattern cards for indicating simultaneously the hooks operated by both sets of griffs, in combination with means for raising both sets of griffs for a short distance, for the purpose specified, and then lifting first one and then the other set of griffs to make two consecutive picks.

7. A Jacquard apparatus consisting of two sets of griffs, hooks actuated thereby and a card presenting cylinder for indicating simultaneously the hooks actuated by both sets of griffs, in combination with a power shaft, cams arranged thereon, and connections from the griffs to the cams, the said cams being formed so as to lift both griffs simultaneously to a height which will not be sufficient to govern a pick but which will be sufficient to prevent the indicated hooks from springing back on to the griff knives on the withdrawal of the pattern card, and then to lift first one and then the other griff to make consecutive picks.

8. A Jacquard apparatus having two independent sets of griffs, hooks operated thereby and indicator mechanism for simultaneously indicating the hooks to be actuated by both sets of griffs in combination with means for moving said griffs simultaneously during a portion only of their upward travel and independently during the remainder of said travel, whereby the hooks that are not to be actuated are prevented from engaging the griffs after the pattern card withdraws and before the griffs begin to form the shed.

ROWLAND CREASEY RICHARDSON.

Witnesses:
CHARLES F. ZIEGLER,
EDW. F. AYRES.